United States Patent [19]

Brucato

[11] 4,348,978
[45] Sep. 14, 1982

[54] AUTA-HELP

[76] Inventor: George C. Brucato, 1 S. 102 Lawler, Lombard, Ill. 60148

[21] Appl. No.: 208,703

[22] Filed: Jan. 13, 1981

[51] Int. Cl.³ .................. B60Q 1/00; G09C 17/00
[52] U.S. Cl. ................... 116/28 R; 116/173; 40/591
[58] Field of Search ............. 40/591; 116/28 R, 173, 116/174, 175

[56] References Cited

U.S. PATENT DOCUMENTS

| 389,806 | 9/1888 | Hale | 116/173 |
|---|---|---|---|
| 3,024,552 | 3/1962 | MacLea | 40/591 |
| 3,036,545 | 5/1962 | Legg | 116/28 R |
| 3,158,132 | 11/1964 | Guthrie | 116/28 R |
| 3,738,039 | 6/1973 | De Furia | 40/591 |
| 4,002,138 | 1/1977 | Dobala | 116/173 |
| 4,015,557 | 4/1977 | Schulein | 40/591 |
| 4,091,553 | 5/1978 | Glennie | 40/591 |
| 4,108,311 | 8/1978 | McClendon | 116/173 |
| 4,163,426 | 8/1979 | O'Neill | 116/28 R |

Primary Examiner—E. R. Kazenske
Assistant Examiner—Denis E. Corr

[57] ABSTRACT

A Auta help, is a flag (emergency) attached to a pole in which is part of a complete unit, pole, grip, and handle. This complete unit fits snugly into a cylinder with the flag on it. The grip and handle part fits over the window of a vehicle in which will hold the flag straight out away from vehicle and also will allow to keep window at an opening of ½ inch. When window is opened the Auta help flag pole grip and handle will be able to be removed, rolled up, and placed back in cylinder for later use.

1 Claim, 3 Drawing Figures

AUTA-HELP

A flag in a cylinder that clips on a sunvisor. In the case of a driver with a health problem where he can no longer drive, he may pull to shoulder or off the road. At this time he or she may pull the flag out of the cylinder with one finger and place it over the edge of the window so as to clip it on. Now he may choose to leave the window opened or closed but only to a ½ inch opening at top. This allows for fumes to escape and allows the police to open vehicle if the driver passes out.

Now, anyone seeing a vehicle with the Auta-Help flag on the window will know, "Person in vehicle needs *Medical Help*".

A passer by can stop and call police, or a C.B. can radio for help. Also it will be easily noticeable by any police vehicle or emergency vehicle. A person may be laying on seat or out of view. But the flag will be noticeable.

The main idea is to be able to get help by warning people of sickness and not being able to get out of Vechicle or worrying about a battery run out of power w/lights.

Figure 1:
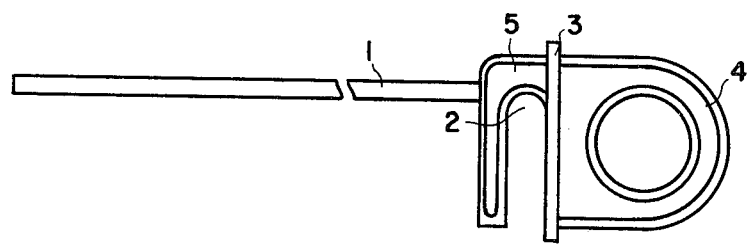

FIG. 1-Is a face view of the handle and pole in which the flag is attached and can easily attach to either window. (passenger or driver)

Figure 2:
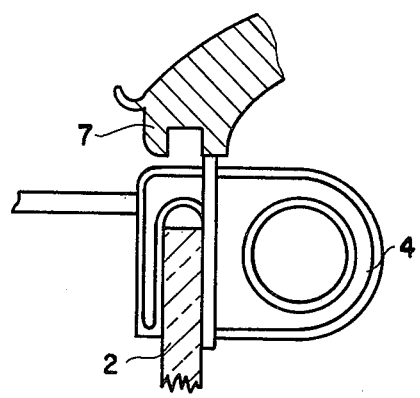

FIG. 2-Is a side view on how the newly improved handle is attached over the edge of the window and butting up against the top frame of the vehicle.

Figure 3:
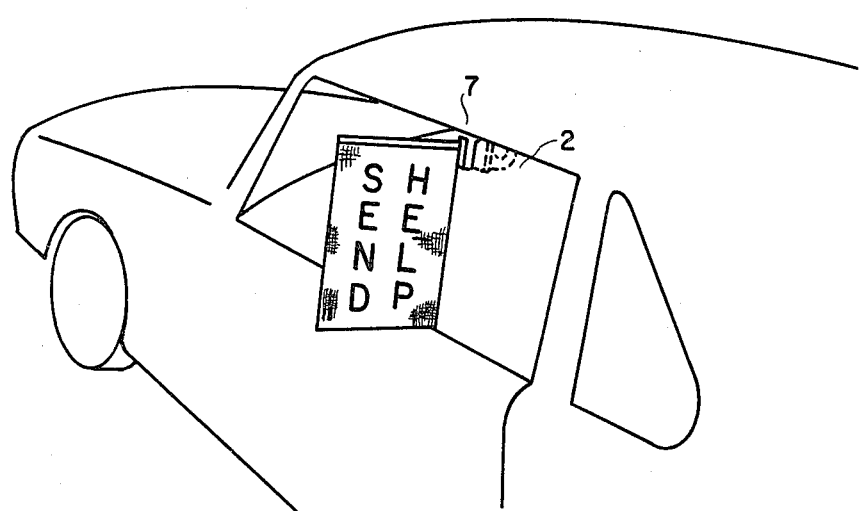

FIG. 3-View of the Auta-Help flag extending out from window of vehicle.

The Auta-Help flag is made of Flourescent Plastic cloth, or silk or reflecting mat which is lettered white over the material of the flag, and is attached to element 1 of the new improved and inexpensive pole and handle of FIG. 1, by glue, or sewing.

Element 1 is a pole part of a handle which is constructed of molded plastic in a rib or flange form which adds extra strength and is of very little cost to produce. At 2 is the section in which a vehicles window will fit as in FIG. 2. Element 5 is of rib-plastic also and is to support window from closing as to allowing the exhaust to escape from a running vehicle. At 3 is the back plate which will rest against window keeping the flag to only extend outwards from window allowing passing vehicles and oncoming traffic to see the flag from either direction. At 4 is the handle part in which can be held by either one finger or the whole hand which ever is easier for the user. As in FIG. 2 the view shows the handle over the window 2 and 3 pressing against window keeping flag extended outwards and also keeping window open at 7 allowing for the exhaust to escape. The handle or finger section 4 which the user will hold while inside of vehicle without leaving his or her seat. In the FIG. 3 view is a window 2 up to the top of vehicle 7 allowing window to stay open while showing flag extended out from the window.

Summary

The invention will allow a driver of a vehicle to notify police, highway workers, or other people that he or she is in the vehicle in need of help. This unit can be used by the person without leaving or getting out of his seat.

I claim:

1. A signal device comprising a flag and a flap pole adapted to be stored inside a cylindrical container, said container adapted to be clipped to a sun visor of a vehicle for ready availability by an occupant of the vehicle;

one edge of said flag being attached to said pole;

said pole having a planar plastic handle on one end thereof, said handle having a grip portion, said grip portion having a circular finger hole therethrough;

said handle having a mounting portion formed therein to embrace the top edge of a vertically movable window of the vehicle, said handle having an extension rising above said mounting portion to maintain the top edge of the window from a closed position when said device is in a mounted position;

and the periphery of said handle and said finger hole being provided with a flange extending perpendicularly to the planar handle for added strength.

* * * * *